UNITED STATES PATENT OFFICE 2,222,938

LUBRICATING OIL

Matthew Fairlie, Hammond, Ind., assignor to Sinclair Refining Company, New York, N. Y., a corporation of Maine No Drawing. Application October 21, 1938, Serial No. 236,192

7 Claims. (Cl. 252—38)

This invention relates to lubricating oils and more particularly to petroleum lubricating oils having improved lubricating properties. Specifically the invention relates to compounded lubricating oils comprising petroleum lubricating oils and a plurality of addition agents which jointly impart the improved lubricating properties to the oils.

The modern trend toward greater speed, higher compression, and improved designs in internal combustion engines has imposed great demands upon the lubricating properties of oils used to lubricate these engines. Higher pressures between moving surfaces and higher operating temperatures are the immediate result of this modern trend, and it has become increasingly more important that a lubricating oil suitable for such engines possess increased film strength and thermal stability to meet these demands.

It has been proposed heretofore to use a halogenated wax, such as chlorinated wax, in order to enhance the lubricating properties of petroleum lubricating oil by imparting increased oiliness and increased film strength. Although chlorinated wax is highly effective in this capacity, such use of this product has not been entirely free from difficulty due to the fact that it tends to decompose at elevated temperature conditions existing within an internal combustion engine. As a result of such decomposition chlorine or hydrochloric acid is slowly liberated. Such decomposition products attack the metal surfaces of an engine with the result that the compounded oil containing the chlorinated wax is branded as corrosive.

The patent to Arnold C. Vobach No. 2,081,075 describes the preparation of calcium phenyl stearate and its use as an addition agent for petroleum lubricating oils for the purpose of improving the thermal stability of such oils. The calcium phenyl stearate described in this patent may consist of calcium phenyl stearate, or may comprise calcium phenyl stearate together with calcium stearate, or calcium phenyl stearate or a mixture of calcium phenyl stearate and calcium stearate together with phenyl stearic acid, the particular composition depending to some extent upon the extent of saponification of the phenyl stearic acid. The expression "calcium phenyl stearate" as used herein and in the appended claims comprises this product described in the Vobach patent.

I have discovered that the desirable lubricating properties imparted to an oil by the incorporation therein of a chlorinated wax are complemented by the addition of calcium phenyl stearate and that the addition of calcium phenyl stearate serves to overcome the undesirable characteristics of the chlorinated wax. I have found that the addition of a substantial quantity of calcium phenyl stearate to a petroleum oil containing chlorinated wax provides a means for removing chlorine or hydrochloric acid from the oil by reaction with the metal of the soap thus eliminating the corrosive element of the lubricating oil-chlorinated wax mixture. A relatively wide range in the amount of calcium phenyl stearate for a given amount of chlorinated wax in the oil may be used with advantage. I have found, however, that maximum improvement is realized by incorporating in the oil an amount of calcium phenyl stearate such that the calcium content of the soap is slightly in excess of the theoretical amount necessary to react with the chlorine in the wax to form the corresponding inorganic salt.

The halogenated wax, such as chlorinated wax, for example, may be prepared with advantage from wax having a melting point between about 120–130° F. by heating the wax sufficiently to render it fluid and by then passing chlorine through the fluid wax until the desired degree of chlorination is effected. The wax is preferably chlorinated to such an extent that the resulting product contains between about 12–43% chlorine by weight, the actual amount of chlorine in the wax depending to a large extent upon the properties of the lubricating oil to be enhanced and the character of the oil to which the chlorinated wax is to be added.

The calcium phenyl stearate may contain varying amounts of calcium. A product suitable for use in the present invention may contain with advantage about 4.9–5.0% calcium although a product containing a smaller or larger percentage of calcium may be used.

In accordance with my invention, I have found that calcium phenyl stearate containing about 5.0% calcium by weight should be used in an amount of approximately 1.5 times that of a chlorinated wax containing about 12% chlorine by weight. Similarly, I have found that a ratio of about 5:1 should be maintained between the amount of calcium phenyl stearate containing about 5.0% calcium by weight and a chlorinated wax containing about 43% chlorine by weight. The relative amount of each addition agent used for a particular lubricating oil and for a particular purpose will vary according to the amount of calcium in the soap and the amount of chlorine in the chlorinated wax.

The actual amount of each addition agent which may be used with advantage will vary depending upon the nature of the oil in which the addition agents are incorporated and upon the use for which a particular blended oil is intended. The amount of chlorinated wax which can be used advantageously ranges from about 0.25% to 1.5% by weight of oil. Moreover, the amount of calcium phenyl stearate incorporated in the oil may vary from about 0.5% to 2.5% by weight of the oil. These ranges are not inflexible but represent the ranges which have been found to include efficacious blends of oil, chlorinated wax, and calcium phenyl stearate. Satisfactory results will be obtained by incorporating 0.75% of a chlorinated wax containing about 12% chlorine by weight and 1.33% calcium phenyl stearate containing about 5.0% calcium by weight in a South Texas oil having an A. P. I. gravity of 20.7, a flash point of 373° F., a viscosity of 506 seconds Saybolt Universal at 100° F., and a viscosity of 53.5 seconds Saybolt Universal at 210° F. This compounded oil was characterized by high film strength and oiliness as well as by high thermal stability without an appreciable increase of its corrosiveness as compared to that of the uncompounded oil.

The calcium phenyl stearate may be incorporated in a mixture of a lubricating oil and chlorinated naphthalene, or the chlorinated naphthalene may be blended with a compounded oil comprising a lubricating oil and calcium phenyl stearate. It is generally unnecessary to heat the oil in order to incorporate the chlorinated naphthalene and calcium phenyl stearate therein in the desired amounts. In many instances it may be desirable to mix the chlorinated naphthalene with the calcium phenyl stearate in the proper ratio and subsequently incorporate this mixture in a lubricating oil the lubricating properties of which it is desired to improve.

The incorporation of both a halogenated wax and calcium phenyl stearate in petroleum lubricating oils in accordance with my invention produces oils of superior lubricating properties. The compounded oils possess increased film strength and thermal stability and are substantially free from the common tendency of many lubricating oils to cause sticking and fouling of piston rings of an internal combustion engine.

I claim:

1. An improved lubricating oil which comprises petroleum lubricating oil containing a small proportion of chlorinated wax and a small proportion of calcium phenyl stearate sufficient in amount to remove chlorine and hydrochloric acid formed by thermal decomposition of the chlorinated wax in the oil.

2. An improved lubricating oil which comprises lubricating oil containing from about 0.25% to 1.5% chlorinated wax and from about 0.5% to 2.5% calcium phenyl stearate.

3. An improved lubricating oil which comprises petroleum lubricating oil containing about 1.33% calcium phenyl stearate and about 0.75% chlorinated wax containing approximately 12% chlorine by weight of the chlorinated wax.

4. An improved lubricating oil which comprises petroleum lubricating oil containing chlorinated wax and an amount of calcium phenyl stearate such that the calcium content of the calcium phenyl stearate is slightly in excess of the theoretical amount necessary to react with the chlorine in the wax.

5. An addition agent for improving the lubricating properties of petroleum lubricating oil which comprises a mixture of chlorinated wax and calcium phenyl stearate, the calcium phenyl stearate being present in amount sufficient to remove chlorine and hydrochloric acid formed by thermal decomposition of the chlorinated wax.

6. An addition agent for improving the lubricating properties of petroleum oil which comprises a mixture of about 1 part of chlorinated wax and from about 1.5 to 5.0 parts of calcium phenyl stearate.

7. An addition agent for improving the lubricating properties of petroleum lubricating oil which comprises a mixture of chlorinated wax and an amount of calcium phenyl stearate such that the calcium content of the calcium phenyl stearate is slightly in excess of the theoretical amount necessary to react with the chlorine in the wax.

MATTHEW FAIRLIE.